June 18, 1968 J. W. GRAY 3,389,271

VOLTAGE-TO-FREQUENCY CONVERSION CIRCUIT

Filed Sept. 14, 1965 4 Sheets-Sheet 1

INVENTOR.

JOHN W. GRAY

BY H. L. Mackey

ATTORNEY

INVENTOR.
JOHN W. GRAY
BY H. L. Mackey
ATTORNEY

VOLTAGE-TO-FREQUENCY CONVERSION CIRCUIT

Filed Sept. 14, 1965 4 Sheets-Sheet 3

INVENTOR.
JOHN W. GRAY
BY H. S. Mackey
ATTORNEY

INVENTOR.
JOHN W. GRAY
BY H. A. Mackey
ATTORNEY

United States Patent Office 3,389,271
Patented June 18, 1968

3,389,271
VOLTAGE-TO-FREQUENCY CONVERSION CIRCUIT

John W. Gray, Pleasantville, N.Y., assignor to General Precision Systems Inc., a corporation of Delaware
Filed Sept. 14, 1965, Ser. No. 487,198
10 Claims. (Cl. 307—235)

The present invention relates to voltage-to-frequency conversion circuits. More particularly the present invention relates to an analog-to-digital integrating conversion circuit employing capacitive reset, which circuit provides an output signal having a frequency value which is proportional to the amplitude of the input voltage. Specifically, the invention herein is an integrated voltage-to-frequency conversion circuit with an input which may accept a positive or a negative analog voltage. The circuit includes provision for distinguishing the polarity of the input voltage and provides one output representative of an input of one polarity, and another output representative of an input of the opposite polarity. In addition, the frequency characteristic of the output is directly proportional to the amplitude of the input voltage.

As an integral part of the invention, capacitance discharge is employed as a reset means with high accuracy attained by employing chopper transistors as critical switching elements. Accuracy also depends on stability of the RC product (R being the input resistance, C being the reset capacitor) and the reference voltage.

The circuit further includes a delay multivibrator that normally functions as a one-shot multivibrator but automatically converts into a free-running multivibrator in the event that the circuit should become saturated. In addition, the multivibrator is self-starting and self-clearing.

The present invention is, in effect, an integrating analog-to-digital converter. The output pulses may be counted electrically or electromechanically and the result is a time integral, in digital form, of an analog input. If the input is from a speedometer, the counted output is distance. If the input is component speeds north-south or east-west, the counted output is the coordinate position. If the input is from an accelerometer output voltage the output of the analog-to-digital converter is velocity in digital form.

In each of the above applications high precision, simplicity and reliability are very important.

Presently available voltage-to-frequency converters of the capacitive reset integrator type employ separate multivibrators, resetting capacitors and voltage sources for positive voltage inputs and for negative voltage inputs in a diode pump arrangement. These converters are relatively complex and inaccurate.

Higher precision is achieved in the present invention by employing chopper transistors in lieu of diodes. Greater simplicity and inherent equality of the positive and negative scale factors are achieved by using the same reference voltage and same capacitor as a reset means for positive voltages and for negative voltages.

It is therefore an object of the invention to provide an integrated voltage-to-frequency conversion circuit which distinguishes the polarity of the input with respect to a reference and provides separate outputs for each polarity respectively, the frequency of the output being directly proportional to the amplitude of the input.

Another object is to provide a voltage-to-frequency conversion circuit employing a capacitive reset.

Another object is to provide an analog-to-digital converter of the reset integrator type employing capacitance discharge as the reset means and chopper transistors as the critical switching elements.

Another object of the invention is to provide a voltage-to-frequency conversion circuit which includes therein a delay multivibrator normally functioning as a monostable multivibrator but automatically converting into a free-running multivibrator when certain of the components of the circuit become saturated so as to cause failure.

Another object is to provide an analog-to-digital converter which, by its output, distinguishes the polarity of the input signal, with respect to a reference, and also provides an output whose frequency is proportional to the amplitude of the input signal.

These and other objects will become apparent from reading the following detailed description with reference to the accompanying drawings in which.

Figure 1:
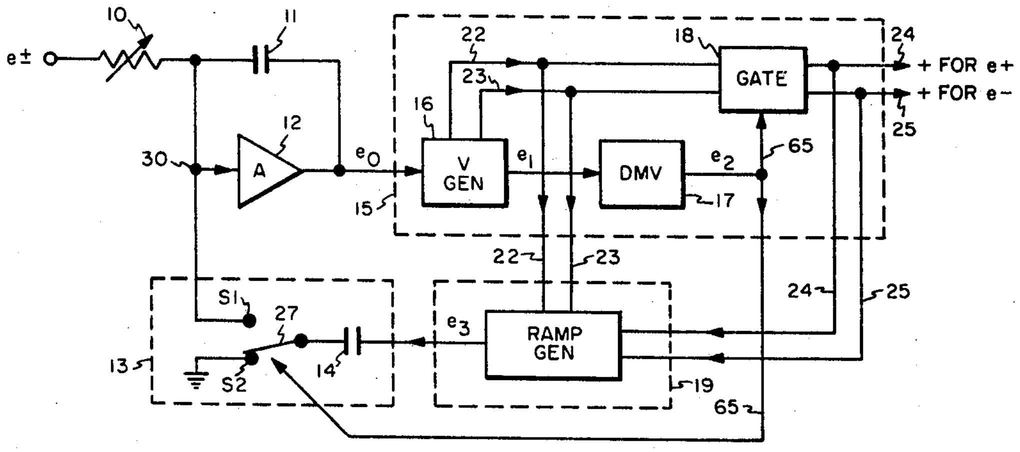
FIG. 1 is a block diagram of the present invention.
Figure 5:
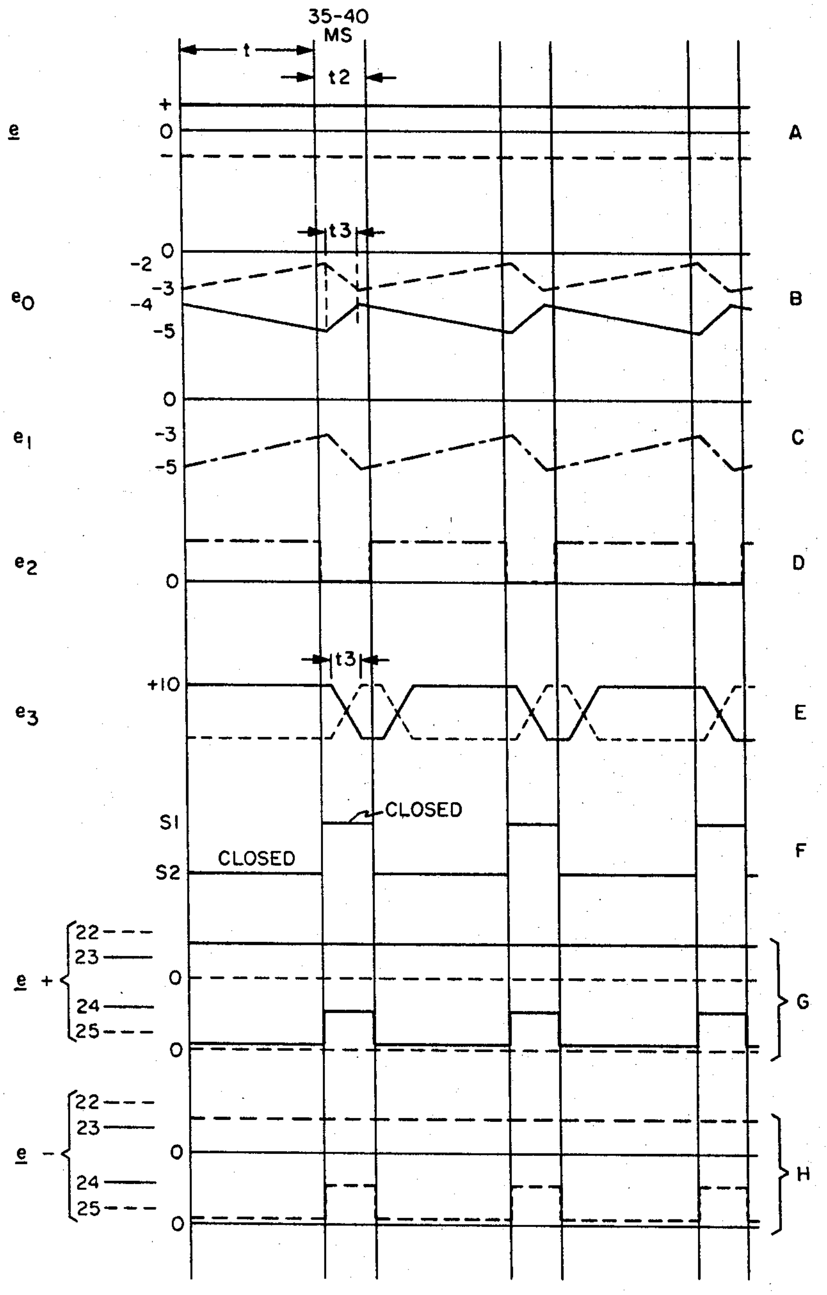
FIG. 5 illustrates representative wave forms and contact closure times helpful in describing the invention.

Referring to the block diagram in FIG. 1, $\underline{e}\pm$ represents that the input signal may be positive or negative, with respect to a reference, zero, for example. The input signal shall hereinafter be referred to as $\underline{e}$. The wave forms A in FIG. 5 represent a positive input signal of $\underline{e}$ in solid line form and a negative input signal of $\underline{e}$ in broken line form. For convenience of description, zero is used as a reference point. Turning to FIG. 5, it should be noted that the symmetrical wave forms at A, B and E particularly, are in solid line form and broken line form.

When the input $\underline{e}$ is positive the wave forms $e_0$(B) and $e_3$(E) are represented in solid line form; conversely when the input $\underline{e}$ is negative the wave forms $e_0$(B) and $e_3$(E) are represented in broken line form. The wave forms occurring on leads 22, 23, 24 and 25 when the input is positive are illustrated at G($\underline{e}$+) and the wave forms on the same leads for a negative input are illustrated at H($\underline{e}$—).

The wave forms represented at C($e_1$) and D($e_2$) in long and short broken lines are common to both a positive input and a negative input.

Section F of FIG. 5 relates to the opening and closure times of the switches S1 and S2.

The wave forms and contact closure times are measured on a time basis. Time $t$ represents an interpulse interval the length of which depends upon the amplitude of the input signal $\underline{e}$. The time $t2$ represents a pulse timer or when the multivibrator is reversed, which is here considered to be 35 to 40 microseconds and the time $t3$ is considered to be 20 microseconds occurring during time $t2$ and is the discharge time of the reset capacitor.

For convenience of description, it will be considered that the input voltage is constant, however, such input may vary over a wide range and be positive or negative with respect to the reference.

The value of the voltage $e_0$ is, for convenience, represented as falling during the interpulse interval $t$ from —4 to —5 volts DC and rising to —4 volts during the time $t3$. The time $t3$ occurs within the interval $t2$ starting a short time after the beginning of the pulse period $t2$ and terminating before termination of the pulse period $t2$. Such amplitude changes occur when the input signal is positive (solid line).

When the input signal is negative (broken line) the value of $e_0$ is represented as rising from some —3 volts to —2 volts during time $t$ and falling to —3 volts during time $t3$.

The slope of the rise (or fall) of the value of $e_0$ during time $t$ will depend on the amplitude of the input signal, the slope of the wave during time $t3$ remaining essentially constant.

As seen in FIG. 1, the voltage $e_0$ represents the output of the integrator 12.

The voltage $e_0$ is applied to the V-wave generator 16, which may be referred to as an absolute magnitude generator. The V generator provides an output $e_1$ (C in FIG. 5) which rises from some negative value, for example, −5 volts through the threshold value of the delay multivibrator 17 which is considered −3 volts. The rise of the voltage $e_1$ occurs during the time $t$ and part of $t2$ and falls during the time $t3$. When the voltage $e_1$ passes through the threshold value of the delay multivibrator 17, a pulse is provided such as seen at D in FIG. 5. Wave form D represents the output pulse of the delay multivibrator which falls from some positive value, for example, +3 volts, to essentially zero. The time interval of the pulse ($t2$) provided may be on the order of 35 to 40 microseconds.

The V generator 16, in addition to the output $e_1$, also provides outputs on leads 22 and 23, which are essentially logic signals. As seen at G, in FIG. 5, when the input is positive ($\underline{e}$+) the lead 22 (broken line) is essentially at zero potential or reference potential and the lead 23 (solid line) is at some positive value.

As seen at H, in FIG. 5, when the input is negative ($\underline{e}$−) the lead 23 is essentially at zero potential or reference potential and the lead 22 is at some positive value.

The leads 22 and 23 are coupled to gate 18 and apply any potential thereon to the gate 18 which also receives the output pulse $e_2$ of the multivibrator. During the time interval $t2$, the gate 18 provides an output pulse on lead 24 when the input $\underline{e}$ is positive, as seen at G in FIG. 5 or provides an output pulse on line 25 when the input $\underline{e}$ is negative. The length of the interpulse period $t$ depends upon the amplitude of the input signal $\underline{e}$, therefore the frequency at which a pulse on lead 24 or 25 may occur, may serve as a measure of the amplitude of the input signal.

Figure 4:
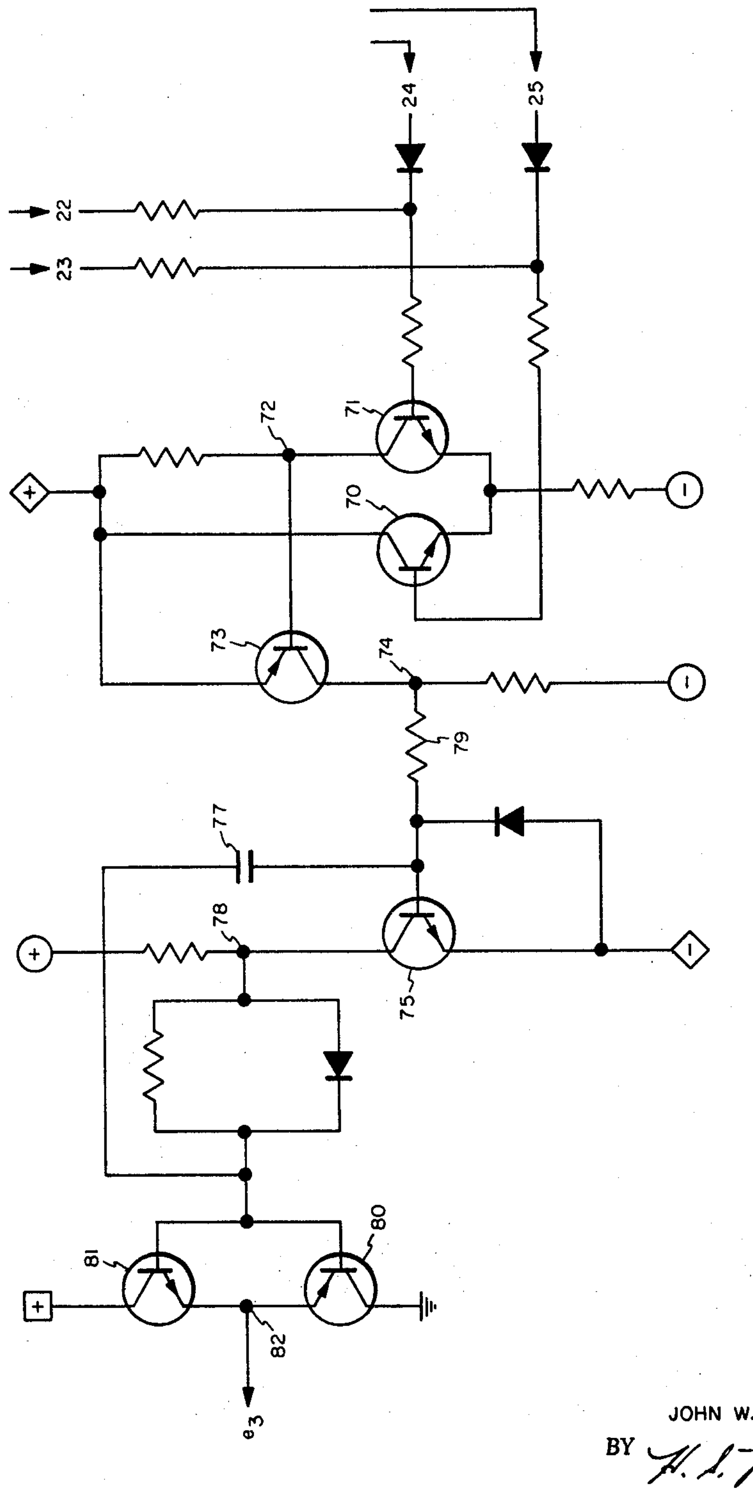
FIG. 4 is a circuit diagram of the broken line block 19 in FIG. 1.

The voltage wave $e_3$ at E represents the output of the ramp generator 19, shown in the block diagram in FIG. 1 and in circuit form in FIG. 4.

The leads 22 and 23 from the V generator and the leads 24 and 25 from the output gate 18 are coupled to the ramp generators.

Since the leads 22 and 23 serve to indicate the polarity of the input signal, the output $e_3$ of the ramp generator is thus selected in accordance with the potential values on the leads 22 and 23. Therefore, if lead 22 is more positive than lead 23, as represented at H, the output $e_3$ will be essentially zero during the latter portion of the interval $t$ and during a portion of time $t2$, and will rise to +10 volts during time $t3$. According to the component values, some time lag occurs after termination of time $t2$ and the output of the ramp generator falls to essentially zero during the next interval $t$, but prior to termination of the interval.

When lead 23 is more positive than lead 22, as shown at G, the output $e_3$ will be +10 volts during the latter part of the interval $t$ and for a portion of time $t2$, and will fall to essentially zero during interval $t3$, but prior to termination of the interval.

Returning to FIG. 1, an analog voltage is applied through adjustable resistance 10, which may represent a network of resistors which may include a fixed resistance and an adjustable resistance such as a potentiometer.

The combination of the integrator 12 and shunting capacitor 11 represents an integrator employing the Miller effect, or a Miller integrator. In its preferred form the integrator is a stabilized integrator, which may, for example, be similar to that taught by Ivan A. Greenwood, Jr. in his United States Patent No. 2,714,136, issued July 26, 1955 under the title "Stabilized Direct Coupled Amplifier."

As seen at B in FIG. 5, the output $e_0$ of the integrator is a negative value voltage which rises during $t$ when the input $\underline{e}$ is negative and falls during $t$ when the input $\underline{e}$ is positive. The differential between the voltage levels on the slope of the wave is approximately one volt. The slope angle of the rise or fall during time $t$ depends on the amplitude of the input $\underline{e}$ since as the amplitude of $\underline{e}$ increases the integrator 12 is driven harder, so that the slope of the wave in increased. This also decreases the time length of interval $t$.

The output $e_0$ of the integrator is applied to the V generator which provides an output which rises from some negative value, for example, −5 volts, through −3 volts which is here considered the threshold value for upsetting the stable condition of the delay multivibrator 17. The slope of the wave $e_1$ is directly related to the slope of the wave $e_0$. The voltage $e_1$, when passing through the threshold value of the delay multivibrator, fires the multivibrator which essentially terminates the interval $t$ upon initiation of the pulse. Thus, the time period of the interval $t$ is a function of the amplitude of the input voltage $\underline{e}$.

The V generator also provides logic output signals, via leads 22 and 23, which are applied to the output gate 18. As shown at G and H of FIG. 5 the potential on one lead is more positive than the other, the more positive potential lead being related to the polarity (positive or negative) of the input signal $\underline{e}$.

The output gate is essentially a logic circuit network which provides an output pulse on lead 24 or 25 according to the polarity of the input $\underline{e}$. Such output pulse is keyed or fired by the appearance of the pulse from the delay multivibrator, the frequency of the pulse appearance being a function of the amplitude of the input voltage; thus the frequency of the output pulse at 24 or 25 is a function of the amplitude of the input voltage.

For example, when $\underline{e}$ is positive, lead 23 is more positive than lead 22 and the combination of the lower potential on lead 22 being applied to gate 18 and the negative pulse $e_2$ being applied to the gate 18 in coincidence provides a positive potential pulse on lead 24, such potential pulse lasting for the duration of the interval $t_2$. The length of interval $t_2$ is determined by the time length of the pulse at $e_2$. This may be seen at G in FIG. 5.

When the input $e$ is negative, lead 22 is more positive than lead 23 and lead 25 becomes positive during the time $t_2$ or during the time the pulse at $e_2$ and the lower potential on lead 23 are applied to the gate 18 in coincidence.

The output pulses appearing at the leads 24 and 25 are represented as + for $\underline{e}$+ (a positive input) on lead 24 and + for $\underline{e}$− (a negative input) on lead 25.

The pulses appearing on either lead 24 or 25 are of substantially constant duration (time $t_2$).

In the embodiment herein described, certain voltage levels and time intervals have been mentioned by way of example. The described embodiment may convert an analog input signal of substantially 0 to +10 volts to a pulsed signal on lead 24 having a frequency of from 0 to 10,000 cycles per second (10 kc.). An analog input signal of substantially 0 to −10 volts will be converted to a pulsed signal output on lead 25 having a frequency of from 0 to 10 kc.

In each case the frequency of the output pulses is directly proportional to the amplitude of the input signal whether the input be positive or negative.

Obviously, the duration of the pulse output of the delay multivibrator 17 (time $t_2$) limits the range of the circuit. That is, the occurrence per second of the output pulses at 24 or 25 may occur so rapidly as to require pulses of shorter duration. The parameters of the circuit may be adjusted by selection of component values so that the time $t_2$ may be of shorter duration with corresponding changes to change the duration of time $t^3$.

By adhering to the principles set forth in the circuitry and functions described herein, the range of input and output of the described invention may be increased.

Figure 2:
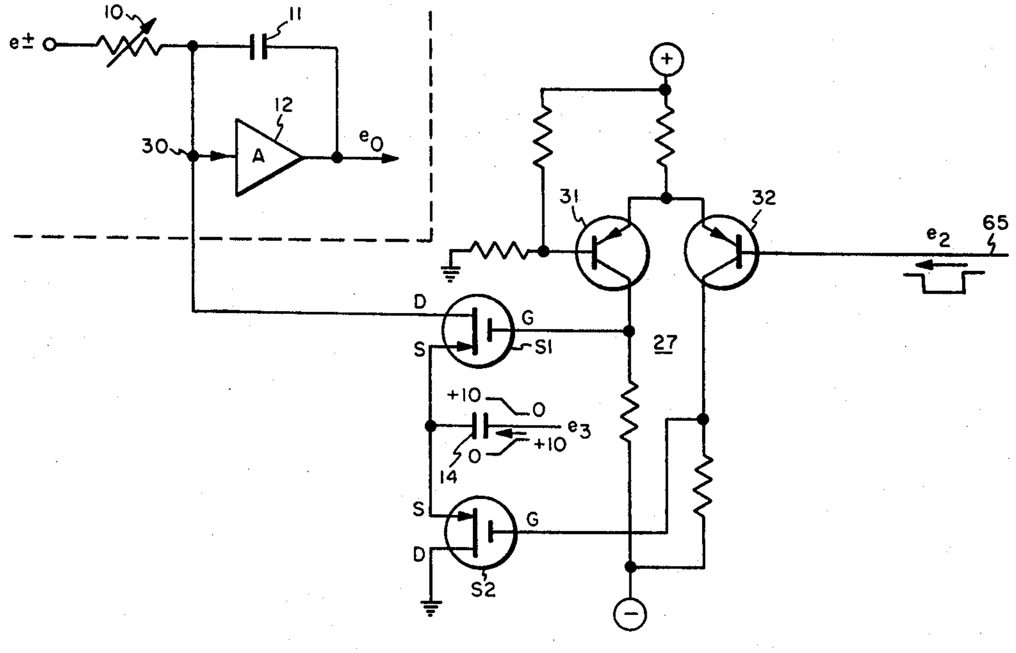
FIG. 2 is a circuit diagram of the broken line block 13 in FIG. 1.

The reset and switch control circuit represented in broken line block 13 and illustrated in circuit form in FIG. 2 and the ramp generator represented in broken line block 19 in FIG. 1 and illustrated in circuit form in FIG. 4, combine to provide capacitive reset of the amplifier 12.

The output level of $e_3$ is clipped at +10 volts with the differential of 10 volts traversed in some 20 microseconds, represented by $t_3$ in FIG. 5. The output $e_3$ is applied to the capacitor 14 and, during time $t_3$ the voltage across capacitor 14 decays to zero indicating zero residual current from capacitor 14 at termination of the interval $t_3$.

Referring to FIG. 2, the capacitor 14 is alternately switched between contact with the summing point 30, via switching transistor S1 and contact with ground, via switching transistor S2. The switching is accomplished by alternately biasing transistor S2 to conduction during time $t$ and biasing transistor S1 to conduction during time $t_2$. The pulse output $e_2$ is employed to obtain the desired switching action. Thus, the network 27 in FIG. 2 illustrates the electronic equivalent of the mechanical representation in FIG. 1 labeled 27. The switching transistors used in the S1 and S2 positions in the preferred embodiment are insulated-gate-field-effect transistors. These have two advantages over conventional bipolar chipper transistors in this application, namely, zero offset voltage in the closed condition and zero current injection via the control electrode, or "gate" (G), which is electrically insulated from the two current carrying electrodes known as "source" (S) and "drain" (D). The latter characteristic is particularly important in the case of S1, since any current introduced at this point via the switch control means would destroy the precision of voltage-to-frequency conversion. If a bipolar transistor is employed, special means are needed to neutralize the base current, such as the use of an isolation transformer.

During the interval $t$ transistor 31 is conducting, thus holding the gate of S1 near ground potential and cutoff thus isolating capacitor 14 from the summing point 30. At the same time, transistor 32 is nonconducting thereby holding the gate of transistor S2 sufficiently negative to drive S2 to a state of conduction. When transistor S2 is conducting capacitor 14 is electrically connected to ground.

A positive power supply of some +15 volts is represented by a plus in a circle while a negative supply of some −15 volts is represented by a minus in a circle. Ground is represented by the usual ground symbol.

During time $t2$ the negative pulse $e_2$ from the delay multivibrator is applied to the base of transistor 32 thereby driving transistor 32 to conduction so as to drive the gate of transistor S2 relatively positive. Transistor S2 is thus driven to cutoff and isolates capacitor 14 from ground. At the same time, transistor 31 becomes nonconducting because of the potential drop at its emitter. When transistor 31 becomes nonconducting, transistor S1 becomes conductive thus electrically connecting capacitor 14 to the summing point 30.

The output $e_3$ of the ramp generator is positive (+10 volts) during time $t$ and part of $t2$ and falls to zero (0) during time $t3$ when the input $\underline{e}$ is positive. When the input $\underline{e}$ is negative the output $e_3$ is substantially zero (0) during time $t$ and part of $t2$ and rises to +10 volts during time $t3$.

Figure 3:
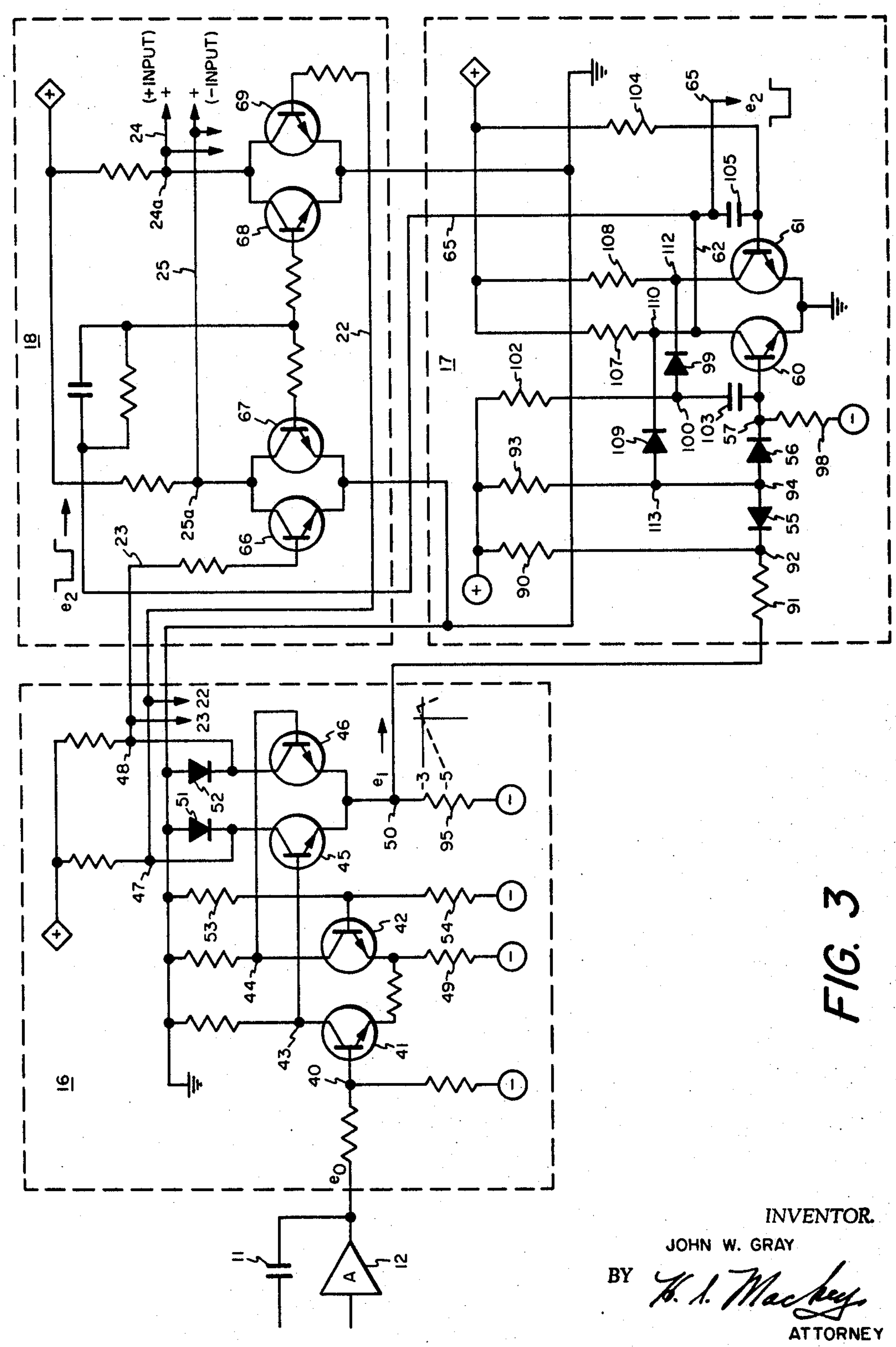
FIG. 3 is a circuit diagram of the broken line block 15 in FIG. 1.

Referring to FIG. 3, the circuitry in the broken line block labeled 16 illustrates the preferred form of V generator, the circuitry in broken line block 17 illustrates the preferred form of delay multivibrator and the circuitry in broken line block 18 illustrates the preferred form of output gate.

As previously described the output $e_0$ is a negative voltage which, when the input $\underline{e}$ is negative, rises from approximately −3 volts to −2 volts and when the input $\underline{e}$ is positive falls from approximately −4 volts to −5 volts.

According to the amplitude of the input $\underline{e}$ the one volt differential of $e_0$ will be traversed in time relatively slow for a small amplitude and more rapidly with increased amplitude.

The transistor network including transistors 41 and 42 is a constant current flow circuit with the current flow distributed between the transistors according to the potential applied to the base of transistor 41. The potential applied to the base of transistor 42 is maintained at a stable negative value as provided by the voltage divider action of resistors 53 and 54. When the input $e_0$ is at its central level (−3.5 volts in this example) the substantially constant current in resistor 49 divides equally between transistors 41 and 42. By swinging the potential applied to the base of transistor 41, the transistor 41 may be made to conduct more heavily so as to reduce conduction of transistor 42 or may be driven toward cutoff thereby driving transistor 42 to conduct more heavily.

Essentially, the input $\underline{e}$ is either negative or positive. When the input $\underline{e}$ is negative the output $e_0$ is rising (see FIG. 5 at B) from some negative value to a less negative value. Thus the potential at junction 40 becomes less negative and increases the current flow through transistor 41. As current flow through transistor 41 is increased, the current flow through transistor 42 is reduced. This effectively drives the potential at junction 43 more negative and the potential at junction 44 less negative.

The potential at junction 43 is applied to the base of transistor 45 and the potential at junction 44 is applied to the base of transistor 46. A more negative potential applied to the base of 45 drives transistor 45 to cut off thereby driving the potential at junction 47 to a positive value. Thus the lead extending from junction 47 is labeled 22. A less negative potential applied to the base of 46 drives the transistor to conduct heavily and the potential at junction 48 goes to essentially zero. Thus the lead extending from junction 48 is labeled 23.

As transistor 46 is driven to conduct more heavly the potential at junction 50 becomes correspondingly less negative, thus providing the output $e_1$.

When the output $e_0$ becomes more negative, such as occurs during time $t$ when the input $\underline{e}$ is positive, the potential at junction 40 becomes more negative. The potional at junction 40 is applied to the base of transistor 41 thereby driving transistor 41 to conduct less heavily. Decreased conduction through 41 causes conduction through transistor 42 to increase. Thus the potential at junction 43 becomes less negative while the potential at junction 44 becomes more negative.

The less negative potential at junction 43 drives transistor 45 to conduct more heavily while the more negative potential at junction 44 drives transistor 46 to conduct less heavily.

When conduction through transistor 46 is reduced, the junction 48 becomes positive. When conduction through transistor 45 is increased, the junction 47 becomes essentially zero.

Diodes 51 and 52 are coupled between ground and the collector terminal of the transistors 45 and 46 respectively with each collector terminal also coupled to a positive supply of some +5 volts, represented by a plus in a diamond shaped rectangle.

This network permits the collector terminal of a heavily conducting transistor to go to ground, thus placing junction 47 or 48 at ground and holds the collector terminal (junction 47 or 48) at a positive potential when the transistor (45 or 46) is not conducting heavily or is cut off.

When junction 43 is less negative than junction 44, i.e., when input $\underline{e}$ is positive, transistor 46 is cut off and transistor 45 acts as an emitter follower, with its collector held at ground potential by diode 51, and its emitter at junction 50 reproducing its input from junction 43. When junction 44 is less negative then junction 43, transistor 45 is cut off and transistor 46 acts as an emitter follower, with its collector held at ground potential by diode 52 and its emitter at junction 50 reproducing its input from junction 44. Thus the V generator output $e_1$ at junction 50 duplicates the potential of junction 43 or junction 44, whichever is less negative.

Thus it will be seen that, during time $t$, whether $e_0$ is going less negative or more negative, the output $e_1$ goes less negative (or rises).

It will be seen that when the input $\underline{e}$ is negative the initial value of $e_0$ during interval $t$ is less negative than the initial value of $e_0$ when the input $\underline{e}$ is positive. Employing the values used in FIG. 5, satisfactory operation of the V generator may be obtained when transistor 41 will conduct at the same rate as transistor 42 when $e_0$ has a value of −3.5 volts. With such adjustment, the potential at junction 47, and therefore lead 22, will be positive and lead 23 be essentially zero when $\underline{e}$ is negative and the potential at junction 48, and therefore lead 23, will be positive and lead 22 will be essentially zero when $\underline{e}$ is positive.

Referring now to the delay multivibrator, illustrated in the broken line block 17, the input $e_1$ is applied to the multivibrator circuit. When the value of $e_1$ is more negative than −3 volts, the transistor 60 is held nonconducting and the output $e_2$ of the multivibrator is at some positive voltage, for example, +4 volts. The parameters of the circuit of the multivibrator are selected so that when the output $e_1$ becomes about −3 volts, on its positive-going excursion, the delay multivibrator fires, reducing its output potential to essentially zero, with respect to ground.

The threshold value of the multivibrator may be set at −3 volts, for example. When the potential at junction 50 is more negative than −3 volts, a small amount of current normally flows through both diodes 55 and 56. However, the current in diode 56 is drawn off to B− (represented by a minus in a circle) via resistor 98 (of relatively high resistance) so that the potential of junction 57 is insufficient to develop conducting bias for the transistor 60. When the potential at junction 50 rises to approximately −3 volts, the diode 55 becomes blocked and diode 56 begins to conduct sufficiently to raise the potential applied to the base of transistor 60 so as to drive transistor 60 to conduction. When transistor 60 conducts (it is normally nonconducting and transistor 61 is normally conducting) the collector terminal of 60 goes to essentially ground potential. This negative transition to applied via lead 62 through capacitor 105 to the base of transistor 61 thereby driving 61 to cut off. The time constant of the capacitor 105 and resistor 104 in combination is such that transistor 60 remains conducting for approximately 35 to 40 microseconds, after which the base voltage of transistor 61 has been restored to its conduction level and the one-shot multivibrator resets itself to its normal or quiescent state. During the time that the ground pulse $e_2$ appears (the wave may be seen at D in FIG. 5) the potential at junction 50 rises somewhat above −3 volts (toward zero) and falls through −3 volts toward −5 volts as seen at C in FIG. 5.

Diodes 55 and 56 serve to isolate the input $e_1$ from the multivibrator during its output pulse so that $e_1$ is free to go both above and below the triggering level without affecting the pulse duration. Triggering is first achieved by means of current from B+ (represented by a plus in a circle) through resistor 93 and diode 56, but during time $t3$, $e_2$ drops and diode 56 ceases to provide current. Thus during the remainder of the pulse the current required at the base of transistor 60 to hold it in its conducting mode is furnished from B+ via resistor 102 and capacitor 103. Diode 99 is nonconducting during the pulse and the time constant of condenser 103 and resistor 102 is such that the potential of junction 100 does not rise to equality with that of junction 112 before the pulse is terminated and junction 112 drops back to ground potential. During the interpulse period $t$, junction 100 is held near ground potential by diode 99, preventing the current from B+ through resistor 102 from causing the multivibrator to be prematurely triggered via capacitor 103. Thus the multivibrator remains in its quiescent condition with only transistor 61 conducting until input $e_1$ has again risen above the threshold level, permitting current from resistor 93 and diode 56 to raise the base of transistor 60 to the level of conduction, to initiate another output pulse.

It was previously mentioned that the one-shot multivibrator is convertible into a free-running multivibrator when the amplitude of the junction 50 remains at or above −3 volts so as to tend to hold transistor 60 conducting. This feature will be discussed below, including the function of diode 109, which serves no purpose in the normal operation just described.

The ground pulse of the voltage wave $e_2$ is applied via lead 65 to the gate circuit 18 and to the switching circuit (FIG. 2).

I have thus far described how the potentials on leads 22 and 23 are selectively provided and how the pulse at $e_2$ is provided.

As seen in the circuit diagram of FIG. 3, and in the block diagram of FIG. 1, the leads 22 and 23 and the lead 65 couple the output potentials from the V generator and the multivibrator, respectively, to the gate circuit 18.

The gate circuit may be in the form of a logic or coincidence circuit such as the dual coupled transistors 66 and 67 forming one coincidence gate and dual coupled transistors 68 and 69 forming another coincidence gate.

When the multivibrator is in its normal condition (during time interval $t$), the signal $e_2$ is at some positive voltage. The signal $e_2$ is coupled via lead 65 to the bases of transistors 67 and 68 thereby holding such transistors conducting. Thus the collector of each transistor is at ground and therefore leads 24 and 25 are both at ground potential. Ignoring momentarily the action of transistors 66 and 69, when the pulsed signal output $e_2$ drops to essentially zero or ground potential, the base of the respective transistors 67 and 68 are biased so that these transistors are driven to cut off and the collector terminals of these transistors would be at some positive potential.

The logic function of the gate circuit 18 includes the use of the transistors 66 and 69 and application of logic signals to the base of each via leads 23 and 22, respectively. As previously mentioned when the input $\underline{e}$ is positive, lead 23 is positive and lead 22 is at ground. Under such conditions the base of transistor 66 will be held positive so as to hold the transistor conducting during time $t$, when transistor 67 is driven to cut off. With either or both transistors 66 and/or 67 conducting the junction 25$a$ is held at ground potential. Thus the output lead 25 will be maintained at essentially ground. However, since lead 22 is at ground, the base of transistor 69 will be held at ground and the transistor 69 held at cut off. During time $t$ when $e_2$ is positive, transistor 68 will conduct thereby holding the junction 24$a$ at ground potential. During the pulse interval, time $t2$, $e_2$ will drop to essentially ground and transistor 68 will be driven to cut off. Thus both transistors 68 and 69 are nonconducting and the junction 24$a$ will rise to a positive potential. This combination provides a positive pulse on lead 24 which serves to indicate that the input $\underline{e}$ is positive with respect to ground or reference. Obviously the positive potential at lead 24 will be essentially a pulse which corresponds in time to the pulse rate and length of the multivibrator output.

As previously stated the frequency of appearance of the multivibrator pulse (going from a positive potential to ground) is directly related to the time of the interpulse interval which is related to the amplitude of the input signal. Thus the potential on lead 24 will swing from essentially ground to some positive potential at a frequency which is directly related to the amplitude of the input.

Thus it may be seen how an analog input may be converted into a digital output signal.

When the input $\underline{e}$ is negative, lead 22 will be positive and lead 23 will be at ground potential and the dual coupled transistors 68 and 69 will be held so that both will be conducting during time $t$, and only one (transistor 69) will be held conducting during the pulse interval (time $t2$), thus holding junction 24a and lead 24 at ground potential during both time intervals. Since lead 23 is held at ground the transistor 66 will be held nonconducting during both time intervals ($t$ and $t2$). During the pulse interval ($t2$) transistor 67 will be driven to cut off while transistor 66 is held cut off, so that during the pulse interval lead 25 will be raised to a positive potential thereby indicating that the input $\underline{e}$ is negative with respect to ground or reference.

FIG. 4 shows the circuit for the ramp generator 16 which selectively provides an output such as $e_3$ in accordance with the polarity of the input. When the input $\underline{e}$ is negative, $e_3$ is held at ground or reference level during interval $t$ and part of interval $t2$. During interval $t3$ the output $e_3$ rises to approximately +10 volts. As seen at E in FIG. 5 the +10 volt potential of $e_3$ is held during the remainder of $t2$ and into the first part of the next interval $t$, after which the potential on $e_3$ returns to ground or reference. The potential change at $e_3$ is symmetrical for an input having a positive polarity.

The voltages $e_3$ are the reset voltages which affect the value of $e_0$ and $e_1$ as seen at B and C in FIG. 5. The potentials $e_3$ are applied to the reset capacitor 14.

During operation of the circuit the potential applied via leads 23 and 22 will be positive on one and ground on the other, in accordance with the polarity of the input $\underline{e}$. If $\underline{e}$ is positive, lead 23 will be positive and lead 22 will be at ground. If $\underline{e}$ is negative, lead 22 will be positive and lead 23 will be at ground. During the interval $t$, the leads 24 and 25 will both be at ground potential. During interval $t2$ one of the leads 24 and 25 will be at positive potential and the other at ground potential according to the polarity of the input $\underline{e}$ (see G and H in FIG. 5).

Looking now at the operation of the ramp generator 19 of FIG. 4, let it be assumed that the input $\underline{e}$ is negative. With a negative input, during the interval $t$, lead 22 will be positive and lead 23 will be essentially ground and both leads 24 and 25 will be essentially ground. The potentials on leads 23 and 25 (both at ground potentials) hold the transistor 70 cut off while the combination of lead 22 being positive and lead 24 negative drives transistor 71 to conduct. When transistor 71 conducts, the junction 72 drops to some negative value sufficient to drive transistor 73 (transistors 73 to a PNP transistor) to conduct which lifts the potential at junction 74 to a positive value sufficient to drive transistor 75 to conduct. When transistor 75 conducts junction 78 falls to some negative value sufficient to cause transistor 80 (a PNP transistor) to conduct and drive transistor 81 (an NPN transistor) to cut off. With transistor 80 conducting, junction 82 is driven to ground potential thus the potential $e_3$ is held at ground.

During time $t2$ the potentials on leads 22, 23 and 24 remain the same as previously described while the potential on lead 25 goes from ground to a positive value. When lead 25 goes positive, transistor 70 is driven to conduction thus driving transistor 71 into cutoff and raising the potential at junction 72 to a value sufficient to drive transistor 73 to cut off. With transistor 73 cut off junction 74 drops to some negative value sufficient to cut off transistor 75. With transistor 75 cut off, junction 78 rises to a positive value which essentially drives transistor 80 to cut off and drives transistor 81 to conduction. With transistor 80 cut off and transistor 81 conducting junction 82 is raised to the value of the potential represented by a plus in a square (+10 volts DC). Thus the potential $e_3$ is raised from essentially ground to essentially +10 volts during time $t3$.

Transistors 80 and 81 are preferably chopper types having very low offset voltages (such as one millivolt or less) between emitter and collector, when the emitter current has dropped to zero and the base current return path is through the collector. Thus after each ramp function when $e_3$ has come to rest and the current in capacitor 14 has ceased to flow, $e_3$ will reside at a level very nearly equal either to ground or +10 volts.

Capacitor 77 is provided to control the acceleration of conduction to nonconduction or nonconduction to conduction of transistor 75. Resistor 79 combines with capacitor 77 to provide the RC time constant of the slope of the wave $e_3$ during time $t3$.

When the input $\underline{e}$ is positive the combination of potentials at leads 22, 23, 24 and 25 are such as to drive the potential $e_3$ to +10 volts during time $t$ and to reduce the potential $e_3$ to essentially ground potential during time $t3$.

The potential $e_3$ is applied to the capacitor 14 which during time $t$ is electrically connected to ground via switch S2 and connected to the summing point 30 via switch S1 during time $t2$.

Thus operation of the several circuit components of my voltage-to-frequency circuit have been described. By combining the operation of these circuit components one can see how an analog voltage may be converted to a frequency with an analog input from, for example, +10 volts to −10 volts and the frequency output on one output lead 0–10 kc. for a positive input voltage and a frequency output on another output lead 0–10 k. for a negative input voltage.

The basic reason for precise linearity between input voltage and output frequency is the fact that all of the current flowing in the input resistor 10 must be disposed of by means of condenser 14 charging and discharging between precise voltage levels. During one complete output cycle or integral number of cycles $e_0$ returns to its starting level so that no net current flows through condenser 11 from the summing point 30. Assuming that the voltage and current input to amplifier 12 are negligible, owing to its very high gain and stability together with the negative feedback via condenser 11, the current in resistor 10, having resistance R, is $$i=\frac{e}{R} \qquad (1)$$

and all of it eventually flows out or in by way of switch S1 to or from condenser 14. If $\underline{e}$ is positive it flows into the condenser by reason that the opposite plate of the condenser falls through a precise voltage range as shown by the $e_3$ wave form at E (solid) in FIG. 5, while S1 is closed. If $\underline{e}$ is negative $e_3$ rises through the same range while S1 is closed, causing the current to flow out of the condenser and into the summing point. In either case the actual current flowing through S1 during time $t3$ is considerably greater than the input current $i$ being determined by the slope of the ramp function $e_3$ and the capacitance of condenser 14. However, the frequency of recurrence of these injections or extractions of current is forced to be such that the *average* current through S1 will be exactly equal to the input $i$. If $i$ should increase, the rate of rise or fall of $e_0$ will increase with it, causing the frequency to increase so a new equilibrium is rapidly achieved. Thus condenser 11 merely provides temporary storage of electricity and its exact value is not a factor in determining frequency.

At the start of an output pulse period $t2$, again assuming negligibly small voltage at junction 30 relative to the reference potential (shown as ground in this embodiment), no quantity of electricity flows in S1 when it is closed and before $e_3$ starts to change, since the opening of S2 and closing of S1 cause no change in potential across condenser 14. During $t3$, $e_3$ changes up or down through a precise range to be referred to as V (10 volts in the example), forcing a quantity of charge through switch S1 equal to $$Q=VC \qquad (2)$$

where C is the capacitance of condenser 14. Ample time is allowed after $e_3$ levels off at the end of $t3$ before S1 is opened by the termination of the pulse time $t2$, for virtually all of the residual charge to be transferred through the small resistance inherent in S1. Thus the quantity per cycle, Q, is determined solely by the parameters V and C and is unaffected by the exact nature or slope of the ramp function of $e_3$. Since this quantity flows to or from the summing point $f$ times per second, where $f$ is the output frequency, it constitutes a current whose average is $$I=Qf=VCf \qquad (3)$$

As demonstrated above the frequency is made to be such that this is equal to the input current $i$, so that $$\frac{e}{R}=VCf \qquad (4)$$

with the result that the output frequency is $$f=\frac{e}{VRC} \qquad (5)$$

In some applications (photocell inputs, for example) it may be convenient to dispense with the input resistor as such as supply a pure current rather than a voltage as input variable. In this instance the controlling formula is simply $$f=\frac{i}{VC} \qquad (6)$$

It was previously mentioned that the one-shot multivibrator shown in circuit form in FIG. 3 may be converted into a free-running multivibrator. In the normal mode of operation of the voltage-to-frequency converter, the upper frequency limit is determined by the delay multivibrator pulse time, $t2$, and the additional time needed to restore $e_3$ to its quiescent level, i.e., to recharge capacitor 14. If the input should become so excessive that the resetting current cannot equal the input current, the Miller integrator output will remain beyond the level required for triggering the delay multivibrator. If the multivibrator were merely a one-shot, designed only to produce a single pulse whenever its input passed a certain level and then remain quiescent, a temporary excessive input could produce a locked out situation which would persist after the input returned to normal, the ability of the circuit to restore $e_0$ to its normal range having been lost. With the multivibrator of this invention automatic restoration to normal is provided by an a-stable, free-running mode which exists when the input $e_1$ remains above the triggering level.

Assuming the input voltage $\underline{e}$ becomes so great, either positive or negative, that after a trigger is produced by $e_1$ the ensuing reset cycle is completed and $e_1$ is still above the level for the next trigger. In this case diode 55 remains blocked. The multivibrator has already returned to its normal quiescent condition with junctions 112 and 100 near ground and transistor 60 nonconducting. But now the current in resistor 93 all flows in diode 56 and most of it is available to recharge capacitor 103, raising the base of transistor 60 toward conduction. A new cycle is started when 60 fires, delivering another reset pulse. Thus the pulses continue until the resetting function is able to restore $e_0$ to normal, which will be true when the input is no longer excessive. The time $t$ in the free-running mode is determined by the values of capacitor 103 and resistors 93 and 102, and is sufficient for the completion of the $e_3$ wave form, but short enough to yield a frequency higher than the maximum required output.

Diode 109 ensures the initiation of oscillation of the multivibrator whenever the input $e_1$ is above the trigger level, regardless of initial conditions. During turn-on, for example, it would be possible for both transistors 60 and 61 to be conducting due to base currents supplied via resistors 93 and 104. Without diode 109 both collectors could be clamped so solidly to ground as to reach a stable state with no oscillation. Diode 109, however, prevents saturation of transistor 60 by drawing off most of the current from resistor 93. Thus transistor 60 retains ample gain to provide the regeneration, via capacitor 105, required to institute the oscillation.

Thus I have provided a self-starting multivibrator and a self-clearing multivibrator as well as a one-shot multivibrator which may be converted into a free-running multivibrator when the trigger voltage remains at or above the threshold level.

The need for the presented type of multivibrator is obvious. This makes the voltage-to-frequency circuit self-starting and also protects against transient voltages hanging-up the multivibrator and provides against hang-up due to saturation of the V generator.

Thus I have described my new voltage-to-frequency conversion circuit including a new multivibrator which aids in the operation of my voltage-to-frequency circuit. Obviously other forms of multivibrators may be used and other forms or equivalents of the components described may be used, or substituted, as will be familiar to those skilled in the art, without departing from the spirit of the invention as defined in the appended claims.

What is claimed is:

1. A voltage-to-frequency converter comprising:
integrator means having an input voltage to be converted applied thereto, said integrator producing an output whose rate of variation depends on the amplitude of said input voltage and the direction of variation of which depends on the polarity of said input voltage,
means connected to the output of said integrator means for generating a sweep voltage whose rate of variation corresponds to the rate of variation of said integrator output and for generating first and second signals whose amplitudes with respect to each other depend on the direction of variation of the output signal of said integrator means,
means actuated by said sweep voltage for generating a pulse signal of selected duration, the time of initiation of which depends on the time said sweep voltage reaches a selected value,
gate means actuated by said pulse signal and said first and second signals producing a first pulse output when the amplitudes of said first and second signals bear one relationship with respect to each other and a second separate pulse output when the amplitudes of said first and second signals bear another relationship to each other, and
means operated by said pulse outputs and said first and second signals for resetting said integrator means during the periods of generation of output pulses.

2. A voltage-to-frequency converter circuit including:
input means for receiving an input voltage,
means responsive to the polarity and amplitude of said input voltage for generating a varying signal representative of the polarity of said input voltage and varying at a rate proportional to the amplitude of said input voltage,
means responsive to said varying signal for generating first and second logic signals having a relationship with respect to each other in accordance with the polarity of said input voltage,
means responsive to said varying signal for generating a sweep voltage in which the rate of sweep of said sweep voltage corresponds to the rate at which said varying signal varies,
means for generating a timed pulse in response to said sweep voltage passing through a predetermined voltage value between the extremes of said sweep,
gate means responsive to said timed pulse for providing a first pulsed output when the relationship between said first and second logic signals indicate said input voltage is of one polarity and for providing a second pulsed output when said first and second logic signals indicate said input voltage is of another polarity, means responsive to said first and second logic signal and said first and second pulsed outputs for generating a voltage signal having a first predetermined value during the interpulse period when said logic signals indicate said input voltage is of one polarity and for varying said voltage signal to a second predetermined value during the timed pulse period and for generating another voltage having said second predetermined value during said interpulse period when said logic signals indicate said input voltage is of another polarity and for varying said another voltage to said first predetermined value during the timed pulse period, a reset capacitor coupled for receiving the voltage signals of the last mentioned means, switch means operable in response to said timed pulse and coupled to said capacitor for coupling said capacitor to a reference during said interpulse period for charging said capacitor to the value of voltage signal output of said last mentioned means and for coupling said capacitor so charged to said input means during the timed pulse period for reducing the voltage level at said input to substantially reference value during said timed pulse period.

3. A voltage-to-frequency converter circuit as in claim 2 and in which said means responsive to the polarity and amplitude of said input voltage includes:

first means for generating a varying signal which rises from a first value to a second value during said interpulse period in response to an input voltage of negative polarity, and second means for generating a varying signal which falls from a third value to a fourth value during said interpulse period in response to an input voltage of positive polarity.

4. A voltage-to-frequency converter circuit as in claim 3 and in which the varying signal output of said first means falls from said second value to said first value during said timed pulse period and the varying signal output of said second means rises from said fourth value to said third value during said timed pulse period.

5. A voltage-to-frequency converter circuit as in claim 2 and in which said means for generating a timed pulse includes:

a monostable multivibrator normally in one condition and reversible to a second condition upon application of an input voltage of a predetermined value, and a threshold circuit for receiving said sweep voltage as an input voltage.

6. A voltage-to-frequency converter circuit as in claim 2 and said gate means includes:

a first coincidence circuit coupled for receiving said first logic signal and said timed pulse and for providing an output during said timed pulse when the relationship between said first and second logic signals indicates said input voltage is of one polarity, and a second coincidence circuit coupled for receiving said second logic signal and said timed pulse and for providing an output during said timed pulse when the relationship between said first and second logic signals indicates said input voltage is of another polarity.

7. A voltage-to-frequency converter including:

input means for receiving a direct current voltage signal and for applying said voltage to a summing point, an integrator for providing a variable signal in response to the voltage applied to said summing point, the signal output of said integrator varying in direction in accordance with the polarity of said direct current voltage and at a rate proportional to the amplitude of said DC voltage, means responsive to the signal output of said integrator for generating first and second signals differing in characteristics with respect to each other in accordance with the polarity of said direct current voltage, and for generating a sweep signal having predetermined terminal values, the rate of said sweep corresponding to the rate of variation of the signal output of said integrator, a multivibrator normally in one condition and providing a first output and reversed to another condition in response to said sweep signal being at or above a predetermined voltage level and providing a second output for a predetermined time interval, gate circuit means for providing a first pulsed output when said direct current voltage is of one polarity and for providing a second pulsed output when said direct current voltage is of opposite polarity, means for coupling said first and second signals to said gate circuit, means for coupling said first and second outputs of said multivibrator to said gate circuit so that said first and second pulsed outputs appear only during said predetermined time interval and said first pulsed output is provided when the characteristics of said first and second signals differ from each other in one respect and said second pulsed output is provided when the characteristics of said first and second signals differ from each other in another respect, a ramp voltage generator for providing an output voltage of a first predetermined value substantially during the time of said first output of said multivibrator and being changed to a second predetermined value substantially during the time of said second output of said multivibrator when said direct current voltage signal is of one polarity and for providing an output voltage of said second predetermined value substantially during the time of said first output of said multivibrator and being changed to said first predetermined value substantially during the time of said second output of said multivibrator when said direct current voltage signal is of opposite polarity, a reset capacitor, means for coupling the output of said ramp voltage generator to one side of said reset capacitor, means for coupling the other side of said reset capacitor to a reference during the time the said multivibrator is in said one condition and for coupling the said other side to said summing point during the time the said multivibrator is in said another condition.

8. A voltage-to-frequency converter as in claim 7 and in which the said integrator includes:

means for providing a varying signal which rises from a first predetermined value to a second predetermined value when the said direct current voltage is negative in polarity, and means for providing a varying signal which falls from a third predetermined value to a fourth predetermined value when the said direct current voltage is positive in polarity, and the rate of rise and the rate of fall is proportional to the amplitude of said direct current voltage.

9. A voltage-to-frequency converter as in claim 8 and further including:

means for coupling the said varying signal to said means for generating, and said generating means includes means responsive to said varying signal for providing said sweep signal which rises regardless of the polarity of said direct current voltage signal.

10. A voltage-to-frequency converter as in claim 7 and in which said multivibrator is a one-shot multivibrator and includes:

a threshold circuit coupled to said generating means for receiving said sweep signal, a first transistor having a base, a collector and an emitter, said base coupled to said threshold and biased for driving said first transistor to conduction when said sweep signal is at or above said predetermined voltage level, a second transistor having a base, a collector and an emitter, the base of said second transistor coupled capacitively to the collector of said first transistor for driving said second transistor to cut off upon conduction of said first transistor, said collector of said second transistor coupled capacitively to the base of said first transistor for driving said first transistor to cut off upon conduction of said second transistor, means for charging the capacitor in the base circuit of said second transistor for driving said second transistor to conduction after having been cut off, and said collector of said first transistor coupled to said base of said first transistor for increasing said cut off bias applied to the base of said first transistor in the event that said sweep signal remains above said predetermined voltage level.

References Cited

UNITED STATES PATENTS 3,022,469 2/1962 Bahrs et al. ------- 332—1 XR

ARTHUR GAUSS, *Primary Examiner.*

E. C. FOLSOM, *Assistant Examiner.*